United States Patent
Vaishnav et al.

(10) Patent No.: US 6,439,329 B1
(45) Date of Patent: Aug. 27, 2002

(54) INTEGRATED BATTERY TRAY AND RESERVOIR ASSEMBLY

(75) Inventors: Dhaval Vaishnav, Canton; Robert Keller, Davisburg; Daniel Osterhart, Auburn Hills; Gregory Hamel, Huntington Woods; Dennis Raney, Northville, all of MI (US)

(73) Assignee: Ford Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/684,878

(22) Filed: Oct. 6, 2000

Related U.S. Application Data

(60) Provisional application No. 60/158,716, filed on Oct. 8, 1999.

(51) Int. Cl.[7] .............................................. B60R 16/04
(52) U.S. Cl. ...................................... 180/68.5; 429/96
(58) Field of Search ........................... 180/68.5; 429/96, 429/100

(56) References Cited

U.S. PATENT DOCUMENTS

| | | | |
|---|---|---|---|
| 3,110,507 A | * | 11/1963 | Riner ......................... 180/68.5 |
| 4,065,170 A | * | 12/1977 | Fabian et al. ............... 180/68.2 |
| 4,087,663 A | | 5/1978 | Sawyer |
| 4,152,021 A | * | 5/1979 | Gotz et al. .................. 180/68.5 |
| 4,282,949 A | * | 8/1981 | Kopich et al. ............... 180/247 |
| 4,667,767 A | * | 5/1987 | Shea et al. .................. 180/247 |
| 4,730,999 A | | 3/1988 | Tsukuda et al. |
| 4,854,540 A | * | 8/1989 | Balek ........................ 180/68.5 |
| 4,976,327 A | | 12/1990 | Abujudom, II et al. |
| 5,429,221 A | | 7/1995 | Tanzer |
| 5,547,036 A | | 8/1996 | Gawaskar et al. |
| 5,566,805 A | | 10/1996 | Sommer |
| 5,636,701 A | | 6/1997 | Norman et al. |
| 5,749,236 A | * | 5/1998 | Tavian et al. ................ 165/204 |
| 6,216,811 B1 | * | 4/2001 | Herc .......................... 180/68.5 |
| 6,340,538 B1 | * | 1/2002 | King .......................... 429/100 |

* cited by examiner

Primary Examiner—Robert P. Olszewski
Assistant Examiner—James S. McClellan
(74) Attorney, Agent, or Firm—Ford Global Tech., Inc.

(57) ABSTRACT

An integrated battery tray and reservoir assembly 10 is provided which is adapted to be operatively installed within the engine compartment of a conventional vehicle. Assembly 10 includes a battery tray portion 12 having a back wall 14 which includes a generally rectangular cavity 16; a vacuum reservoir plate 18 which is sealingly attached to back wall 14 and which cooperates with back wall 14 and cavity 16 to form a sealed vacuum reservoir 20; a valve housing portion 22 which fluidly communicates with reservoir 20; a solenoid valve assembly 24; and a check valve assembly 26. A vacuum hub locks pulse supply line 30 is coupled to valve 24 and selectively receives vacuum pulses from valve 24. Assembly 10 further includes an engine vacuum line 32 and an HVAC vacuum line 28 which are fluidly coupled to vacuum reservoir 20 and which respectively provide and receive vacuum pressure to/from reservoir 20.

9 Claims, 6 Drawing Sheets

INTEGRATED BATTERY TRAY AND RESERVOIR ASSEMBLY

This application claims the benefit of U.S. provisional application No. 60/158,716, filed Oct. 8, 1999.

FIELD OF INVENTION

The present invention relates to an integrated battery tray and reservoir assembly and more particularly, to an integrated battery tray and reservoir assembly for use within a vehicle which efficiently combines a battery tray, a vacuum reservoir and other vehicle components into a single assembly, thereby eliminating components, reducing the complexity and cost of the vehicle, increasing packaging efficiency, and improving system stiffness and robustness.

BACKGROUND OF THE INVENTION

Vehicle engine compartments typically house numerous devices such as a battery containment system or tray, a windshield washer fluid reservoir assembly, one or more vacuum reservoir assemblies (e.g., for use with a heating ventilation and air conditioning or "HVAC" system and/or a vacuum pulse actuated hub lock system), and various electrical components. The engine compartment further includes various wires, conduits and tubes which are used to couple these assemblies to other portions of the vehicle, and several support structures which are used to mount and hold these assemblies and components.

The numerous individual components, structures, conduits and assemblies within the engine compartment undesirably lengthen and complicate the manufacturing process, decrease packaging efficiency and increase the overall cost of the vehicle. Particularly, these numerous assemblies and components are typically packaged and installed on an individual "component-by-component" basis and are not integrated or combined with other necessary structural and functional assemblies. Thus, these components and assemblies must each be independently assembled, tested, connected and mounted within the engine compartment, thereby adding to the complexity of the engine compartment and complicating and lengthening the overall vehicle assembly process.

Therefore, a need exists for an integrated battery tray and reservoir assembly which combines the structural attributes of several engine compartment components into a single assembly, thereby desirably reducing the weight, complexity, cost and packaging space of the vehicle.

SUMMARY OF THE INVENTION

A first advantage of the present invention is that it provides an integrated battery tray and reservoir assembly which overcomes the various and previously delineated drawbacks of prior assemblies and systems.

A second advantage of the present invention is that it provides an integrated battery tray and reservoir assembly that efficiently combines battery tray containment and support functions with a vacuum reservoir in a single synergistic system.

A third advantage of the present invention is that it provides an integrated battery tray and reservoir assembly that efficiently combines a battery tray, a windshield washer fluid reservoir assembly, an HVAC vacuum reservoir, a four wheel drive hub locks vacuum reservoir, and an electrical actuator.

A fourth advantage of the present invention is that it provides an integrated battery tray and reservoir assembly which houses a vacuum reservoir, an electrical actuator and a check valve assembly in a single structure, thereby eliminating long hoses and reducing vacuum system leaks.

According to a first aspect of the present invention, an integrated battery tray and reservoir assembly is provided. The assembly includes a first battery tray portion including a first surface; and a second portion which is attached to the first surface and which cooperates with the first surface to form a vacuum reservoir.

According to a second aspect of the present invention, a method is disclosed for providing an integrated battery tray and reservoir assembly for a vehicle of the type including an engine compartment and an engine manifold. The method includes the steps of providing a one-piece molded battery tray including a first wall having a cavity; providing a cover member; sealingly attaching the cover member to the first wall around the cavity, thereby forming a sealed vacuum reservoir within the battery tray; mounting the battery tray within the engine compartment; and fluidly coupling the engine manifold to the vacuum reservoir by use of a first conduit, effective to selectively provide the vacuum reservoir with a vacuum pressure.

These and other objects, aspects, features, and advantages of the present invention will become apparent from a consideration of the following specification and the attached drawings.

DETAILED DESCRIPTION OF THE PREFERRED EMBODIMENT OF THE INVENTION

Figure 1:
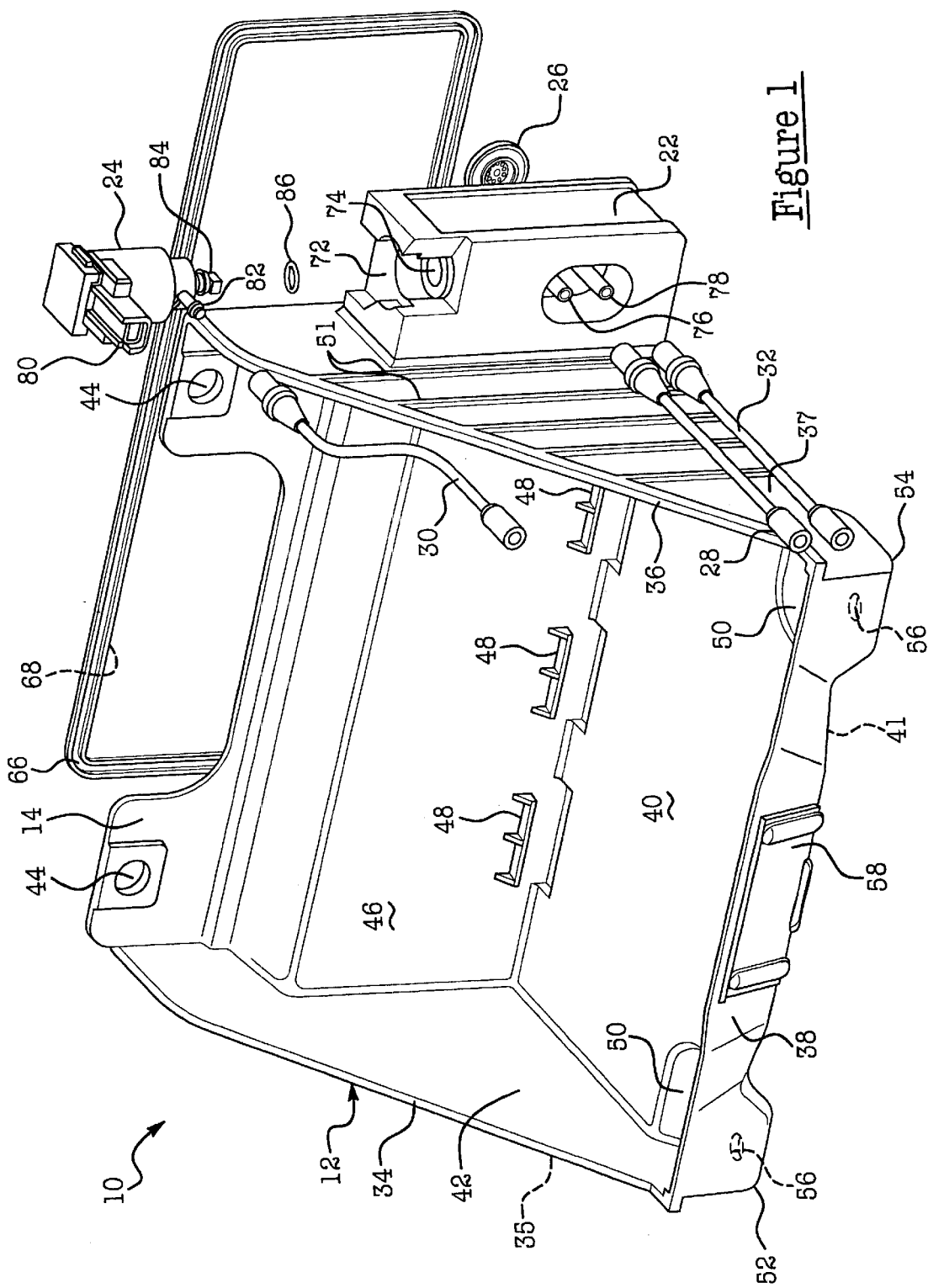
FIG. 1 is a front exploded view of an integrated battery tray and reservoir assembly which is made in accordance with the teachings of a first embodiment of the present invention.
Figure 2:
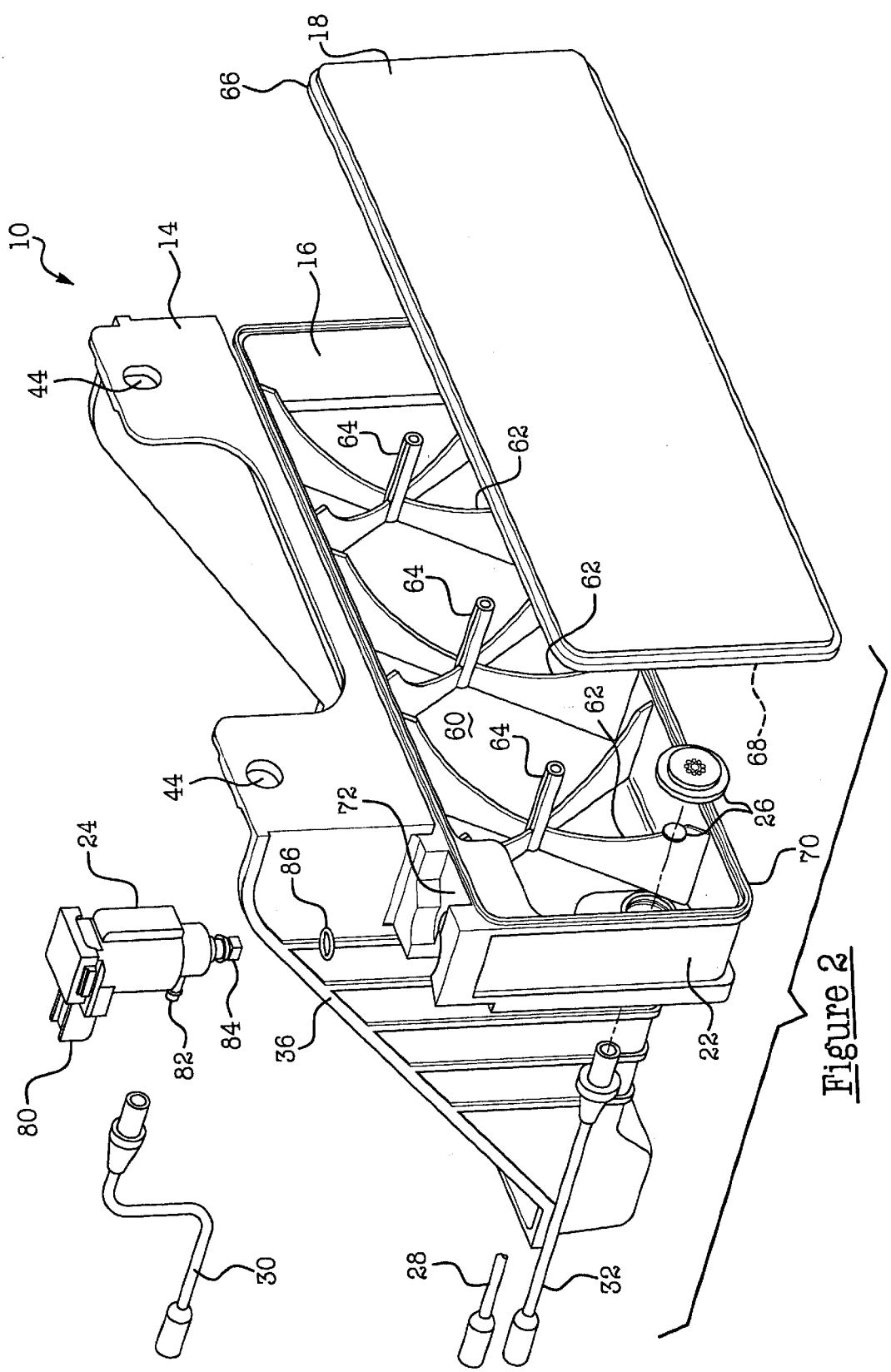
FIG. 2 is a rear exploded view of the integrated battery tray and reservoir assembly shown in FIG. 1.
Figure 3:
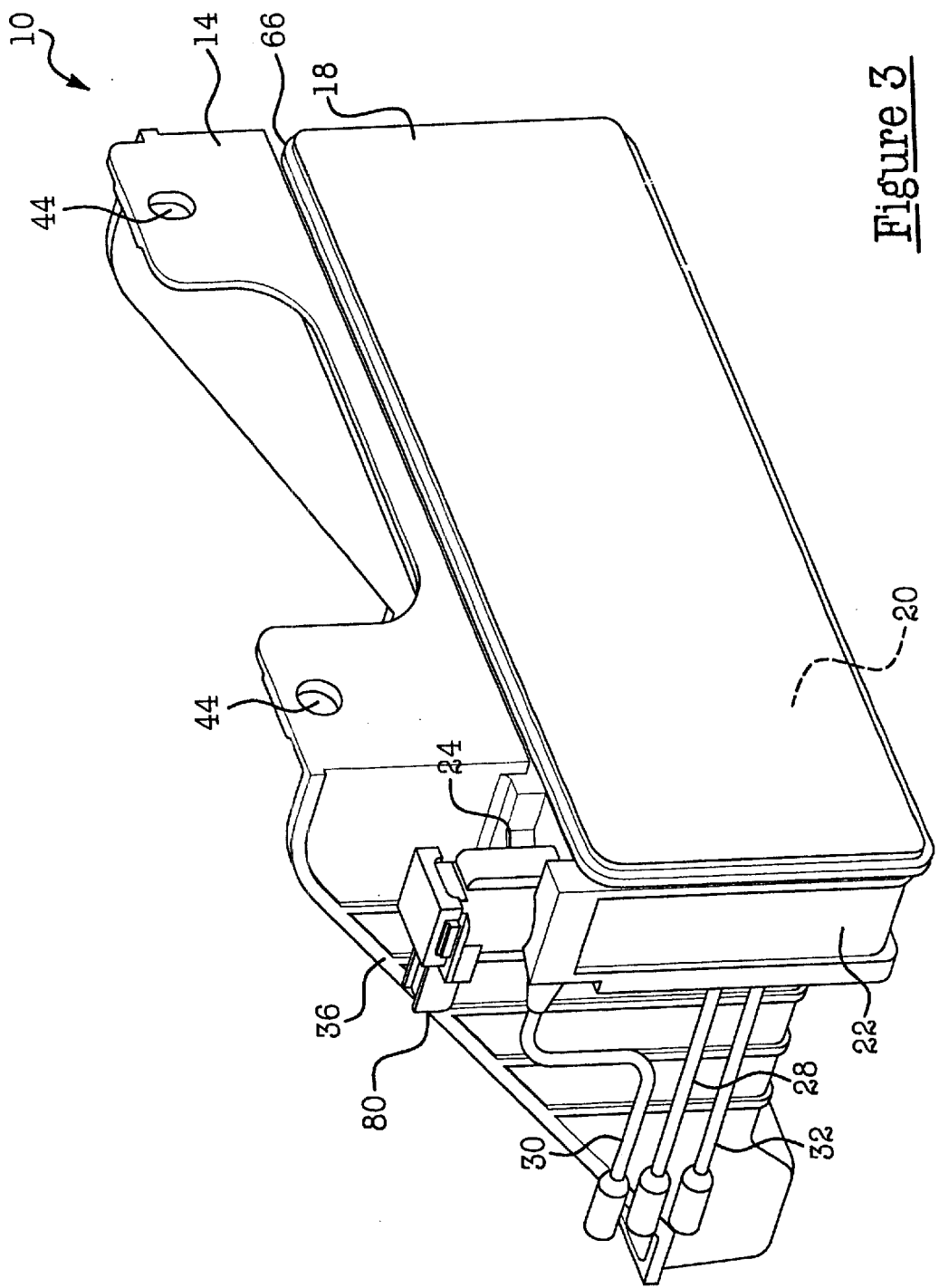
FIG. 3 is a rear assembled view of the integrated battery tray and reservoir assembly shown in FIG. 1.

Referring now to FIGS. 1–3, there is shown an integrated battery tray and reservoir apparatus or assembly 10 which is made in accordance with the teachings of a first embodiment of the invention. Assembly 10 is adapted to be operatively installed within an automotive vehicle and more particularly, within the engine compartment of an automotive vehicle.

Assembly 10 includes a battery tray or containment portion 12 having a back wall 14 which includes a generally rectangular cavity 16; a vacuum reservoir plate or cover member 18 which is sealingly attached to back wall 14 and which cooperates with back wall 14 and cavity 16 to form a sealed vacuum reservoir 20; a valve housing portion 22 which fluidly communicates with reservoir 20; and valve assemblies 24, 26 which are operatively disposed within valve housing 22. Assembly 10 further includes an HVAC vacuum line or conduit 28, a vacuum hub locks pulse supply line or conduit 30, and an engine vacuum line or conduit 32.

Battery tray portion 12, valve housing portion 22 and reservoir plate 18 are each manufactured from a strong, rigid and durable material such as a conventional plastic, metal or composite material. In the preferred embodiment, battery tray portion 12 comprises a one-piece molded structure having a back wall 14, a pair of side walls 34, 36, a front wall 38 and a generally rectangular bottom portion 40. Walls 14, 34, 36, and 38 and bottom portion 40 cooperate to form a battery containment cavity or area 42 which is adapted to receive and contain a conventional vehicle battery (not shown). The back wall 14 of battery tray 12 includes a pair of apertures 44 which are formed along the top of back wall 14 and which allow assembly 10 to be selectively mounted within an engine compartment. Particularly, apertures 44 are adapted to receive conventional fasteners (not shown) that selectively couple assembly 10 to a portion of the vehicle body or frame. Back wall 14 further includes a generally flat inner surface 46 having three substantially identical spacers 48 which are integrally formed with back portion 14 and which are effective to allow a vehicle battery assembly to be "snapped into place" and secured within containment portion 42. Particularly, a portion of a conventional vehicle battery assembly is adapted to conformingly (e.g., frictionally) fit between spacers 48 and the bottom portion 40 of battery tray 12. Side walls 34, 36 and bottom portion 40 include ribbed portions 51 which are formed on the outer surfaces 35, 37 of walls 34, 36 and the outer surface 41 of bottom portion 40 and which increase the structural strength and rigidity of battery tray 12. In alternate embodiments, the exterior surfaces 35, 37 of side walls 34, 36 can be further molded and/or shaped to include various housing and attachment type features which allow other vehicle components, electronics and accessories to be relatively easily attached to or "nested" within assembly 10.

Bottom portion 40 includes a pair of drainage depressions 50 which are located in the "left" and "right" front corners 52, 54 of battery tray 12 and which include apertures 56 which allow water and other fluids to drain from the battery tray 12. A clamp or bracket member 58 is attached to front wall 38 and bottom portion 40 in a location which is approximately equidistant from each corner 52, 54. Bracket 58 allows assembly 10 to be further coupled to a vehicle body in a known and conventional manner.

As shown best in FIG. 2, the outer surface 60 of back wall 14 which forms cavity 16 includes several generally "X"-shaped integrally formed ribbed structures 62 which provide additional structural support to the back wall 14 and vacuum reservoir 20. Each ribbed structure 62 includes a centrally disposed support member 64 which orthogonally projects from surface 60. Each projecting member 64 abuttingly engages back plate 18 and provides support to back plate 18 when reservoir 20 is under vacuum pressure. In one non-limiting embodiment, projecting members 64 are adapted to receive conventional fasteners which may be used to secure back plate 18 to back wall 14.

Back plate 18 is generally rectangular and includes an outer flange portion 66 and an inner recessed portion 68 which conformingly (e.g., frictionally) and sealingly engages ridge 70 which is formed on back wall 14 around cavity 16, thereby cooperating with back wall 14 to form the sealed vacuum reservoir 20.

Valve housing portion 22 is integrally formed with and/or otherwise fixedly coupled to side wall 36. In the preferred embodiment, valve housing portion 22 and battery tray 12 comprise a one-piece molded assembly. Valve housing portion 22 includes an upper recessed or valve seat portion 72 which receives and supports solenoid valve assembly 24. Portion 72 includes a generally cylindrical channel 74 which fluidly communicates with reservoir 20. Valve housing 22 further includes a pair of conduits or terminals 76, 78 which fluidly communicate with reservoir 20 and which respectively allow conduits 28 and 32 to be fluidly coupled to reservoir 20.

In the preferred embodiment, valve assembly 24 is a conventional electrically actuated (e.g., solenoid) valve and includes an electrical terminal 80 which allows valve 24 to be electrically and communicatively coupled to a vehicle controller (not shown) which controls the operation of the solenoid valve 24. Solenoid valve 24 further includes a vacuum pulse output terminal 82 which is sealingly coupled to conduit 30 and a vacuum input terminal 84 which is sealingly disposed within channel 74 and which communicates with reservoir 20. A conventional o-ring 86 is disposed around terminal 84 and provides an airtight seal between terminal 84 and housing 22. Solenoid valve 24 is effective to selectively connect terminal 82 to the vacuum reservoir 20 by way of terminal 84, thereby selectively providing vacuum pulses to conduit 30 which are used to actuate a conventional four wheel drive vacuum pulse hub locks assembly (not shown).

Valve assembly 26 is a conventional one-way check valve assembly. Valve assembly 26 is operatively coupled to the back side of terminal 78 and is effective to maintain a vacuum condition within reservoir 20 when the engine manifold vacuum drops below a certain level. Particularly, the check valve 26 is operatively disposed between the vacuum reservoir and the engine manifold and allows the HVAC and hub locks systems to utilize the vacuum stored within reservoir 20 until the vacuum in reservoir 20 is replenished by increasing the engine manifold vacuum.

HVAC vacuum conduit 28 is operatively coupled to terminal 76 and to the vehicle's HVAC system. Conduit 28 selectively delivers vacuum pressure to the vehicle's HVAC system for HVAC applications. Conduit 32 is operatively coupled to terminal 78 and to the vehicle's engine manifold. Conduit 32 is effective to selectively transport or provide vacuum pressure from the vehicle's engine manifold to the vacuum reservoir 20, thereby replenishing the vacuum reservoir 20.

In operation, battery tray portion 12, back plate 18 and valve housing portion 22 cooperate to provide an integrated battery tray, a vacuum reservoir and valve housing assembly. The integrated battery tray and vacuum reservoir assembly 10 may be installed within a vehicle engine compartment in a relatively quick and simple manner, and offers a significant advantage over prior art battery tray and vacuum reservoir assemblies.

Particularly, assembly 10 efficiently combines the vehicle battery support structure, a valve housing assembly and both an HVAC and hub locks vacuum reservoir into a single synergistic system. By using the same structures to form functional portions of multiple assemblies, assembly 10 reduces the number of vehicle components. For example and without limitation, the use of back wall 14 to form both a portion of the battery tray 12 and the vacuum reservoir 20 eliminates the need for a separate vacuum reservoir and the need to secure the vacuum reservoir to a separate portion of the vehicle. Moreover, the use of side wall 36 to form both a portion of the battery tray 12 and the valve housing 22 eliminates the need for a separate valve housing and the need to secure the valve housing to another portion of the vehicle. Housing the valve assemblies in the same structure as the vacuum reservoir further eliminates long hoses, pinch points, bracketry and other potential leak paths. In this manner, the integrated battery and reservoir assembly 10 improves vehicle emissions and system robustness by reducing and eliminating potential vacuum leak paths.

The reduced number of components further reduces the assembly process which increases quality and allows the entire assembly to be leak checked prior to being inserted into the vehicle. Also, this reduction in components greatly decreases costs through designing, manufacturing, inventorying, assembling and servicing of fewer parts. Furthermore, the integrated battery and reservoir assembly 10 takes up less warehouse space, reduces shipping costs because there are fewer components to individually ship, and reduces overall freight costs. Moreover, administrative costs are reduced because there are fewer part numbers to track and fewer suppliers to manage. Additionally, the reduced number of components also shortens the overall build time of the vehicle.

Figure 4:
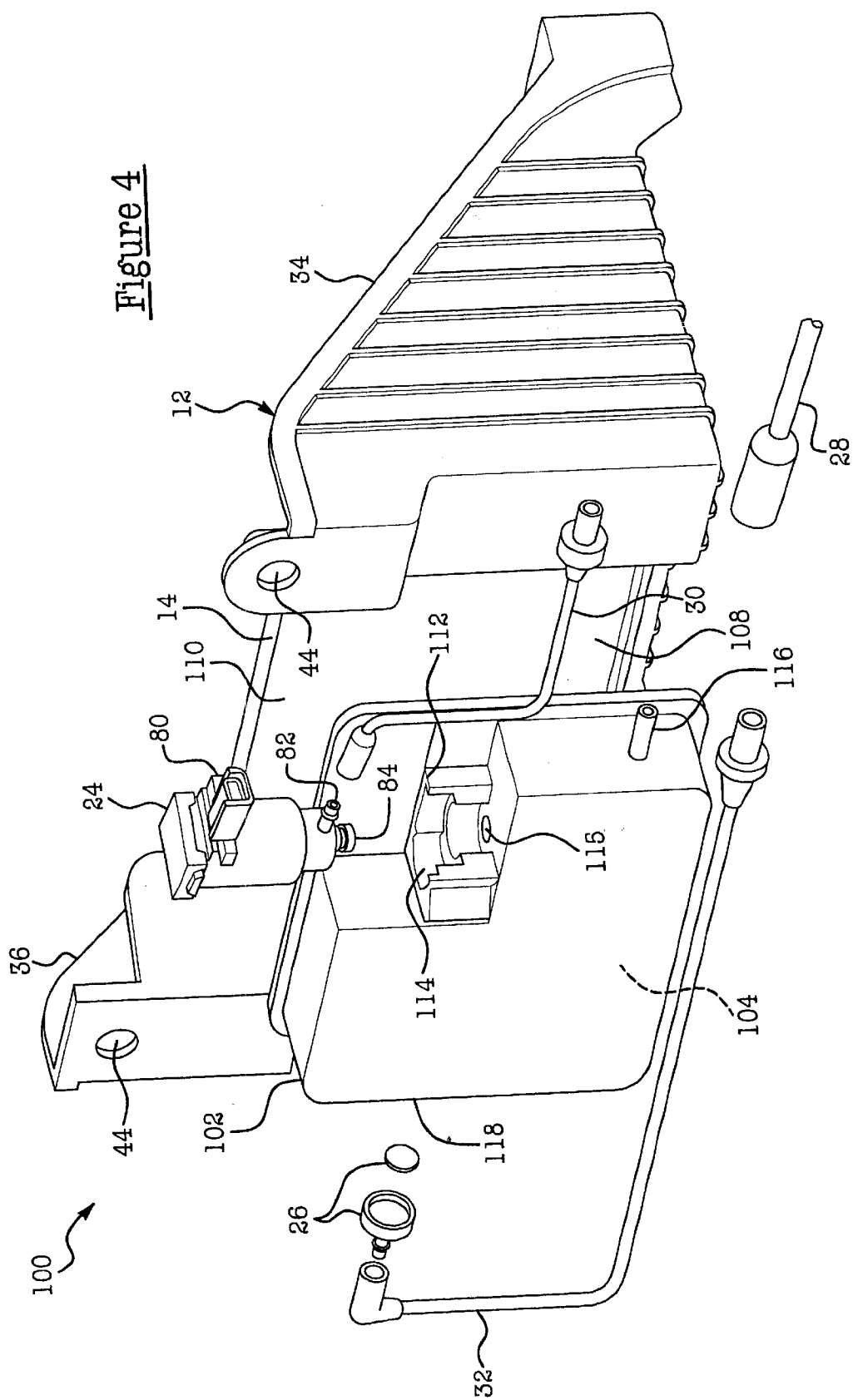
FIG. 4 is an exploded view of an integrated battery tray and reservoir assembly which is made in accordance with the teachings of a second embodiment of the present invention.

Referring now to FIG. 4, there is shown an integrated battery tray and reservoir assembly 100 which is made in accordance with the teachings of a second embodiment of the present invention. Assembly 100 is substantially identical in structure and function to assembly 10 with the following exceptions. Back plate 18 and valve housing 22 have been replaced with a one-piece vacuum reservoir and valve housing 102 which is sealingly attached to surface 110 of back wall 14 in a conventional manner. Housing 102 includes an inner generally "L"-shaped cavity 104. In this embodiment, back wall 14 includes a recessed portion 108 which replaces cavity 16 and which forms the substantially flat outer surface 110. When housing 102 is sealingly attached to surface 110 cavity 104 forms a sealed vacuum reservoir.

Housing 102 includes an integrally formed valve housing portion 112. Valve housing portion 112 includes an upper recessed valve seat portion 114 which receives and supports solenoid valve assembly 24. A generally cylindrical channel 115 is formed within portion 112 and fluidly communicates with the vacuum reservoir. Housing 102 further includes a pair of conduits or terminals 116, 118 which fluidly communicate with the vacuum reservoir and which respectively allow conduits 28 and 32 to be fluidly coupled to the reservoir.

In alternate embodiments, the side walls 34, 36 and/or housing 102 can be further molded and/or shaped to include various housing and attachment type features which allow other vehicle components, electronics and accessories to be relatively easily attached to or "nested" within assembly 100.

The integrated battery tray and reservoir assembly 100 provides substantially the same benefits as assembly 10. Particularly, assembly 100 significantly reduces the number of vehicle components and the number of required assembly processes and structures. For example and without limitation, the use of back wall 14 to form both a portion of the battery tray 12 and the vacuum reservoir eliminates the need for a separate vacuum reservoir and the need to secure the vacuum reservoir to a separate portion of the vehicle. Moreover, the integration of the valve housing 112 and the vacuum reservoir eliminates the need for a separate valve housing and the need to secure the valve housing 112 to the vacuum reservoir or to another portion of the vehicle.

Housing the valve assemblies 24, 26 in the same structure as the vacuum reservoir eliminates long hoses, pinch points, bracketry and other potential leak paths. Further, integrating the valve housing portion 112 with the vacuum reservoir allows the entire valve and reservoir assembly (e.g., housing 102 and valves 24, 26) to be contained "behind" battery tray portion 12, thereby causing the overall length of assembly 100 to be less than that of assembly 10. Additionally, the arrangement of assembly 100 provides for an alternate location for connecting conduits 28, 32 to the vacuum reservoir and for connecting conduit 30 to valve 24 (e.g., "behind" the battery tray 12 as opposed to on the side of battery tray 12).

Figure 5:
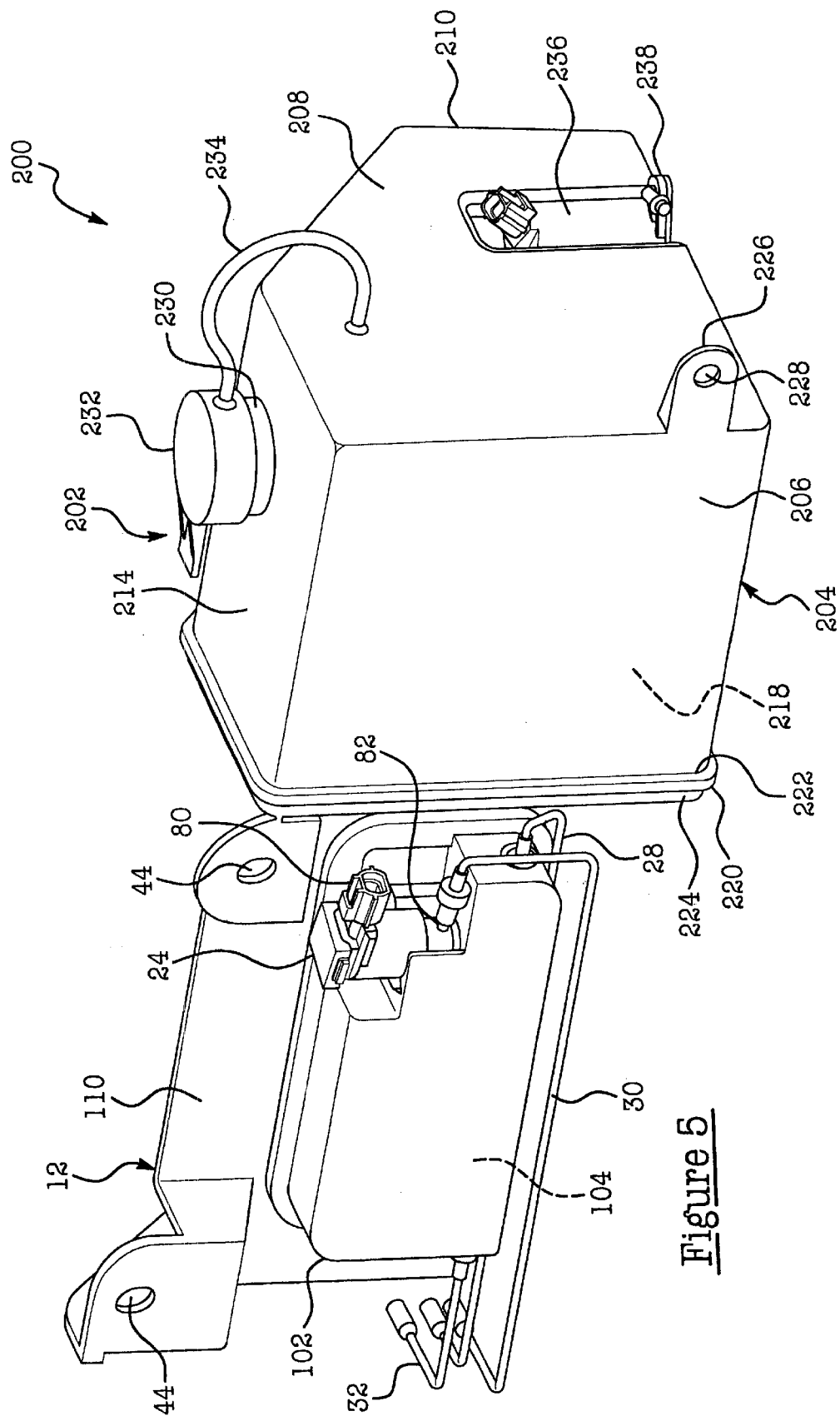
FIG. 5 is a rear perspective view of an integrated battery tray and reservoir assembly which is made in accordance with the teachings of a third embodiment of the present invention.
Figure 6:
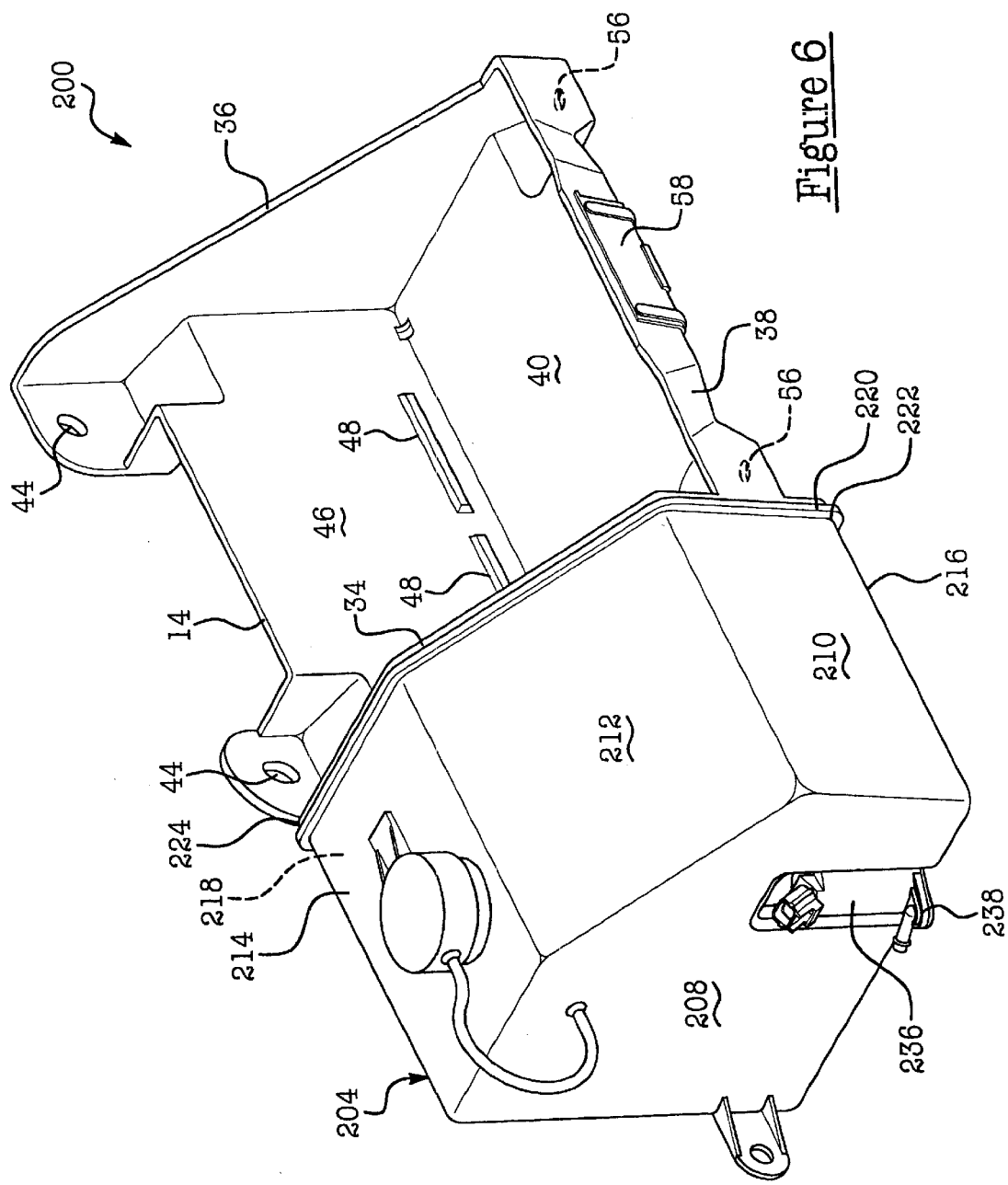
FIG. 6 is front perspective view of the integrated battery tray and reservoir assembly shown in FIG. 5.

Referring now to FIGS. 5–6, there is shown an integrated battery tray and reservoir assembly 200 which is made in accordance with the teachings of a third embodiment of the invention and which further integrates a windshield washer fluid reservoir assembly 202 with battery tray 12 and vacuum reservoir housing 102. Assembly 200 is substantially similar to assembly 100 with the following exceptions. Assembly 200 includes windshield washer fluid reservoir assembly 202. Assembly 202 includes a body portion 204 including wall or side portions 206, 208, 210, 212, and 214 and bottom 216. Body portion 204 is attached to side wall 34 of battery tray portion 12 in a conventional manner and cooperates with side wall 34 to form a sealed reservoir 218 for selectively receiving and storing an amount of washer fluid. In the preferred embodiment of the invention, body portion 204 includes a flange portion 220 which is formed along edge 222 (e.g., of walls 206, 210, 212, 214 and bottom 216) and which conformingly (e.g., frictionally) and sealingly engages ridge 224 which is formed on outer periphery of side wall 34, thereby forming the sealed washer reservoir 218. In one alternate embodiment, walls 206, 210, 212, 214 and bottom 216 are integrally formed with side wall 34 (e.g., battery tray 12, walls 206, 210, 212, 214 and bottom 216 form a one-piece molded structure), and wall 208 is selectively attachable to walls 206, 210, 212, 214 and bottom 216 in a conventional manner. In other alternate embodiments, body or housing portion 204 of washer reservoir assembly 202 may have other shapes and have additional or different portions or walls which are integrally formed with battery tray 12. In alternate embodiments, the exterior surfaces of assembly 200 can be further molded and/or shaped to include various housing and attachment type features which allow other vehicle components, electronics and accessories to be relatively easily attached to or "nested" within assembly 200.

Back wall 206 of washer reservoir assembly 202 includes a flange 226 including an aperture 228 which is adapted to receive a conventional fastener, thereby allowing assembly 200 to be further secured to a vehicle frame or body. Top wall 214 includes a generally circular conduit 230 which communicates with reservoir 218, effective to allow washer fluid to be selectively placed within reservoir 218. A cap 232 selectively and frictionally engages conduit 230 and prevents fluid from "splashing" or escaping from reservoir 218. Cap 232 is coupled to side wall 208 by use of an elastic (e.g., plastic) member 234.

Washer reservoir assembly 202 further includes a conventional pump assembly 236 which is operatively disposed within side wall 208 and which communicates with reservoir 218. Pump assembly 236 is adapted to be selectively attached to one or more conduits (not shown) and to deliver washer fluid to the windshield of the vehicle by way of the conduits. Assembly 202 further includes a conventional level sensor 238 which is operatively disposed and/or attached to the bottom of pump assembly 236 and which is adapted to alert the driver of the vehicle to low washer fluid levels.

The integrated battery tray and reservoir assembly 200 provides all of the foregoing benefits of assemblies 10 and 100 and further provides the additional benefits of integrating another engine compartment component (e.g., the washer fluid reservoir assembly) into a single assembly. Thus, assembly 200 further reduces the number of vehicle components and the number of required assembly processes and structures. Particularly, the integration of the washer fluid reservoir 202 with the battery tray 12 by use of a common structure (e.g., wall 34) eliminates the need for a separate washer fluid reservoir housing and the need to secure the washer fluid reservoir to another portion of the vehicle. Furthermore, integrating the washer fluid reservoir with the battery tray further improves the stiffness and the strength of the battery tray and of the assembly 200 as a whole.

It should be understood that this invention is not to be limited to the exact construction or embodiment described above but that various changes may be made without departing from the spirit or scope of the invention.

What is claimed is:

1. A battery tray assembly comprising:

a first bottom support wall having first and second opposed edges;

a pair of sidewalls which are each coupled to a unique one of said first and second opposed edges; and a second portion having a surface which cooperates with said first bottom support wall to form a battery containment cavity, said second portion containing a pressure vacuum reservoir which extends between said pair of sidewalls and which resides above said bottom battery support wall, wherein one of said pair of side walls further having an integrally formed valve housing portion which is located outside of said pressure vacuum reservoir, wherein said integrally formed valve housing includes a top surface which is conformed to receive an electrically actuated solenoid having a vacuum pulse output.

2. The assembly of claim 1 further comprising a pressure vacuum reservoir cover member which removably and selectively attaches to said pressure vacuum reservoir and which cooperates with said pressure vacuum reservoir to form an air-tight pressure vacuum reservoir.

3. The assembly of claim 1 wherein said surface of said second portion further includes at least two substantially identical spacers which are integrally formed upon said second surface and which frictionally receive and secure a vehicular battery within said battery containment cavity.

4. The assembly of claim 1 wherein said bottom support wall further comprises at least one recessed drainage aperture.

5. The assembly of claim 1 wherein said integrally formed valve housing further comprises:

a first HVAC vacuum output conduit which is coupled to said pressure vacuum reservoir and to a HVAC assembly;

a second vacuum pulse conduit which is coupled to said vacuum reservoir and a vacuum pulse hub locks assembly; and an input conduit.

6. The assembly of claim 5 wherein said input conduit is coupled to an engine manifold and to said pressure vacuum reservoir effective to maintain a pressure in said pressure vacuum reservoir.

7. The assembly of claim 1 wherein pressure vacuum reservoir further includes a plurality of generally X-shaped integrally formed ribbed structures which provide structural support to said vacuum reservoir.

8. The assembly of claim 7 wherein said integrally formed rib structures further comprise a centrally disposed and projecting support member which abuttingly engages said and which provide further structural support to said vacuum reservoir.

9. The assembly of claim 1 wherein said first bottom support wall further comprises a lip portion which is approximately one-fifth the height of said surface of said second portion and which opposes said surface of said second portion, and wherein said pair of sidewalls are tapered from the top of said surface of said second portion to the top of said lip portion.

\* \* \* \* \*